Nov. 13, 1923.
J. C. M. DUPONT
1,474,109
SADDLE SUPPORT ADAPTABLE TO CYCLES AND MOTOR CYCLES
Filed Nov. 21. 1921
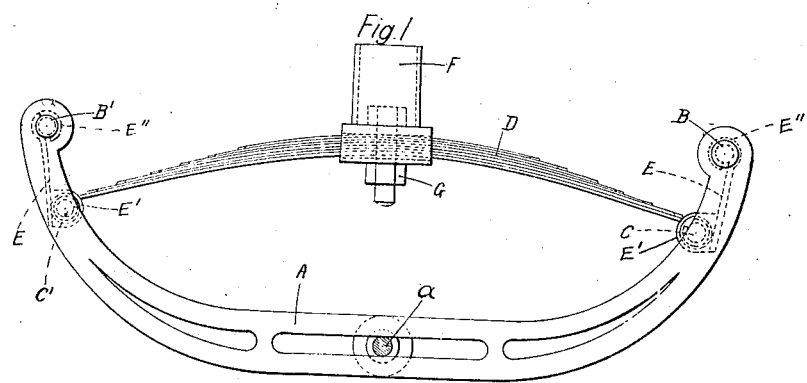
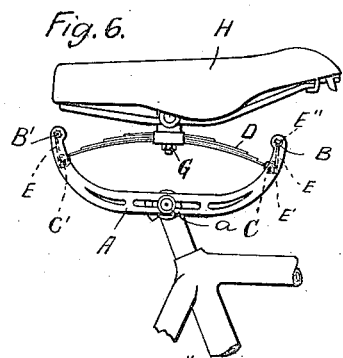
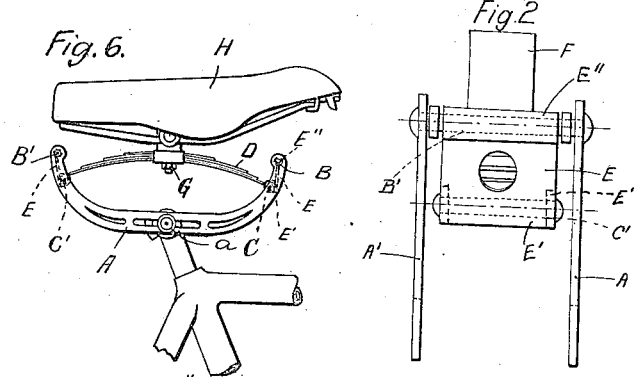
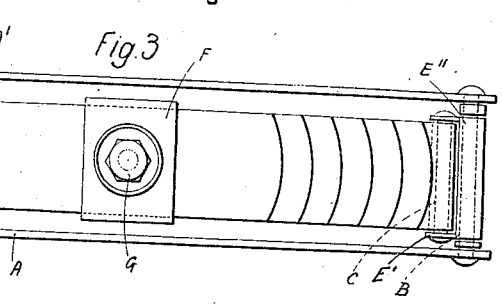
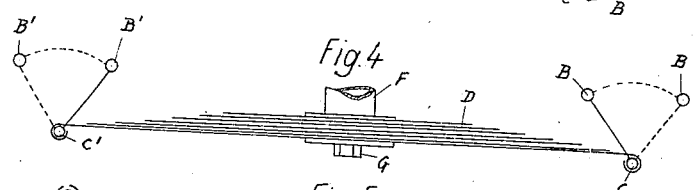
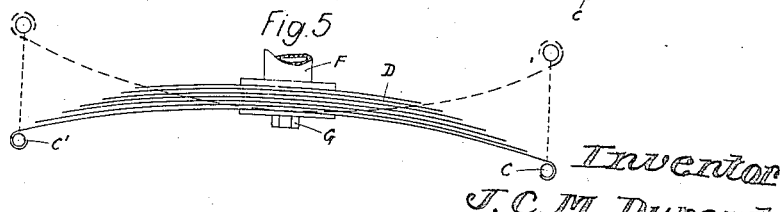

Patented Nov. 13, 1923.

1,474,109

UNITED STATES PATENT OFFICE.

JULES CARLOS MARIE DUPONT, OF VALENCIENNES, FRANCE.

SADDLE SUPPORT ADAPTABLE TO CYCLES AND MOTOR CYCLES.

Application filed November 21, 1921. Serial No. 516,770.

*To all whom it may concern:*

Be it known that I, JULES CARLOS MARIE DUPONT, engineer, citizen of the French Republic, residing at Valenciennes, Department of the Nord, in France, have invented certain new and useful Improvements in Saddle Supports Adaptable to Cycles and Motor Cycles; and I do hereby declare the following to be a full, clear, and exact description of the invention, such as will enable others skilled in the art to which it appertains to make and use the same.

This invention has reference generally to improvements in saddles for cycles and more particularly relates to an improved saddle support therefor.

Briefly the invention consists of a laminated spring which has secured thereto the saddle proper, the ends of the spring being suspended as by links between the side members which in turn are fixed to the frame of the cycle.

Other objects as well as the nature, characteristic features and scope of the invention will be more readily apparent from the following description taken in connection with the accompanying drawings and pointed out in the claim forming a part of this specification.

The invention is clearly illustrated in the drawings, in which:—

Fig. 1 is a side elevational view of the saddle support,

Fig. 2 is an end view thereof,

Fig. 3 is a plan view,

Figs. 4 and 5 are diagrams showing the manner in which the spring is deflected during use, and Fig. 6 is a side elevation of the saddle support in operable relation to the saddle and a cycle only a portion of which latter is shown.

Referring now, more particularly to the accompanying drawings there are provided two side plate members A and A' which have parallel medial portions and upwardly curved end portions the latter being connected by bolts B and B' as shown in plan in Fig. 3. The medial portions of these members are connected to the frame of the cycle by suitable fastening means a.

A resilient member in the form of a laminated spring D is now employed, the lower leaf terminating at its ends in loops for receiving pintles C, C', the ends of which pintles are in turn engaged with the spaced lugs or ears E' of links E. The upper ends of the links E are formed with tubular bearing portions E'' for disposition about the bolts B, B' and for coacting with the bolts in maintaining the members A, A' in spaced relation. By this arrangement it will be appreciated that the spring D is capable of flexing in a vertical plane and is likewise capable of swinging longitudinally between the upper end portions of the members A, A'.

A saddle supporting member F is connected medially of the ends of the spring D by a nut and bolt arrangement G.

Assuming that the parts have been assembled in the manner described and as indicated in the drawings, it is apparent that when the cyclist is on the saddle H, the spring D, Fig. 4, is practically on a straight line and the points C, C' remain nearly in the same plane, but their position relatively to the points B, B' varies on account of the oscillations transmitted by the members A and A', as the spring swings on its links.

In Fig. 5 is shown the damping effect of the support relative to the vertical oscillations; points C and C' are displaced vertically.

In view of the foregoing a further detailed description of the operation of the invention is entirely unnecessary. Likewise it is believed that the advantages will be readily apparent.

Having thus fully described the invention what is claimed as new and desired to be secured by Letters Patent is:—

A saddle support for cycles including a pair of longitudinally spaced supporting members having upwardly curved ends, means for connecting the upper ends of the members together, means for attaching the medial portions to the cycles of the frame, an upwardly bowed semi-eliptical spring including a plurality of laminated plates, links having their lower ends pivoted to the ends of the spring and having their upper ends formed with tubular bearing portions for swingable engagement with the connecting means and for coacting with the connecting means for maintaining the members in proper spaced relation and a saddle carrying member connected medially of the ends of the spring, substantially as and for the purposes set forth.

In testimony whereof I affix my signature.

JULES CARLOS MARIE DUPONT.

Witnesses:
GERMAINE SPAERS,
JEANNE CHOMAR.